(12) United States Patent
Yang

(10) Patent No.: US 8,783,797 B2
(45) Date of Patent: Jul. 22, 2014

(54) ELECTRONIC DEVICE HAVING CARD HOLDER

(71) Applicants: Fu Tai Hua Industry (Shenzhen) Co., Ltd., Shenzhen (CN); Hon Hai Precision Industry Co., Ltd., New Taipei (TW)

(72) Inventor: Li-Jun Yang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 30 days.

(21) Appl. No.: 13/719,153

(22) Filed: Dec. 18, 2012

(65) Prior Publication Data

US 2014/0117821 A1    May 1, 2014

(30) Foreign Application Priority Data

Oct. 30, 2012 (CN) ......................... 2012 1 04228465

(51) Int. Cl.
*H05K 5/00* (2006.01)

(52) U.S. Cl.
USPC .................................. 312/223.2; 361/679.31

(58) Field of Classification Search
USPC ................. 312/223.1, 223.2; 361/679.31
See application file for complete search history.

(56) References Cited

U.S. PATENT DOCUMENTS

| | | | | |
|---|---|---|---|---|
| 5,574,625 | A * | 11/1996 | Ohgami et al. | 361/679.09 |
| 6,570,759 | B1 * | 5/2003 | Chien | 361/679.34 |
| 7,681,210 | B2 * | 3/2010 | Jiang et al. | 720/638 |
| 7,929,289 | B2 * | 4/2011 | Tseng | 361/679.39 |
| 8,345,416 | B2 * | 1/2013 | Liang et al. | 361/679.31 |
| 8,405,967 | B2 * | 3/2013 | Dong et al. | 361/679.31 |
| 8,568,151 | B2 * | 10/2013 | Cheng | 439/131 |
| 8,644,032 | B2 * | 2/2014 | Liang et al. | 361/807 |
| 2007/0060198 | A1 * | 3/2007 | Kuo | 455/558 |
| 2010/0193583 | A1 * | 8/2010 | Tartavull et al. | 235/375 |
| 2013/0163184 | A1 * | 6/2013 | Fujiwara et al. | 361/679.38 |
| 2013/0301209 | A1 * | 11/2013 | Zhou | 361/679.32 |

* cited by examiner

*Primary Examiner* — Daniel Rohrhoff
(74) *Attorney, Agent, or Firm* — Novak Druce Connolly Bove + Quigg LLP

(57) ABSTRACT

An electronic device includes a housing, a card holder, and a card holder control mechanism. The housing defines a first slot. The card holder defining a receiving recess. A resisting block protrudes from the card holder. The resisting block includes an inclined surface facing the receiving recess. The inclined surface includes a first end and a second end. The card holder control mechanism includes a pushing post, a slidable button, and an elastic element. An upper end of the pushing post is connected to the slidable button, and a lower end of the pushing post is disposed on the card holder and resists the second end of the inclined surface. The slidable button includes an operation portion extending through the housing through the second slot. One end of the elastic element is connected to the slidable button, and an opposite end is connected to the housing.

5 Claims, 5 Drawing Sheets

ELECTRONIC DEVICE HAVING CARD HOLDER

BACKGROUND

1. Technical Field

The present disclosure relates to electronic devices and, particularly, to an electronic device providing access to a card holder of the electronic device.

2. Description of Related Art

To access a mobile phone smart card, a cover and a battery must often first be removed, or at least a cover must be removed, which is inconvenient. Therefore, what is needed is an electronic device which provides better access to the smart card.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
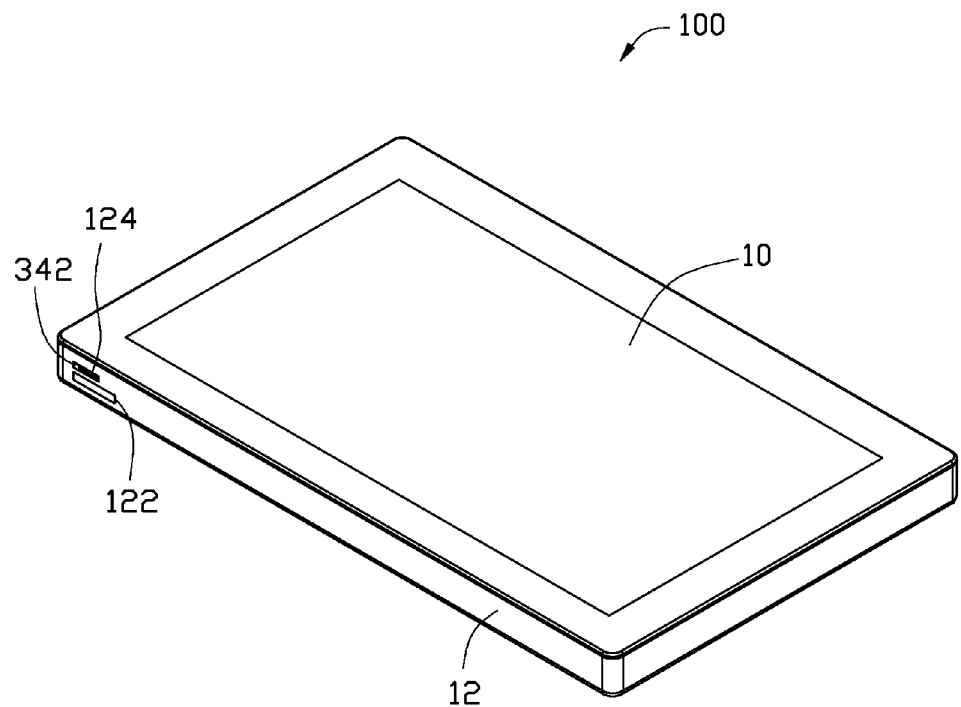
FIG. 1 is an isometric view of an embodiment of an electronic device having card holder.
Figure 2:
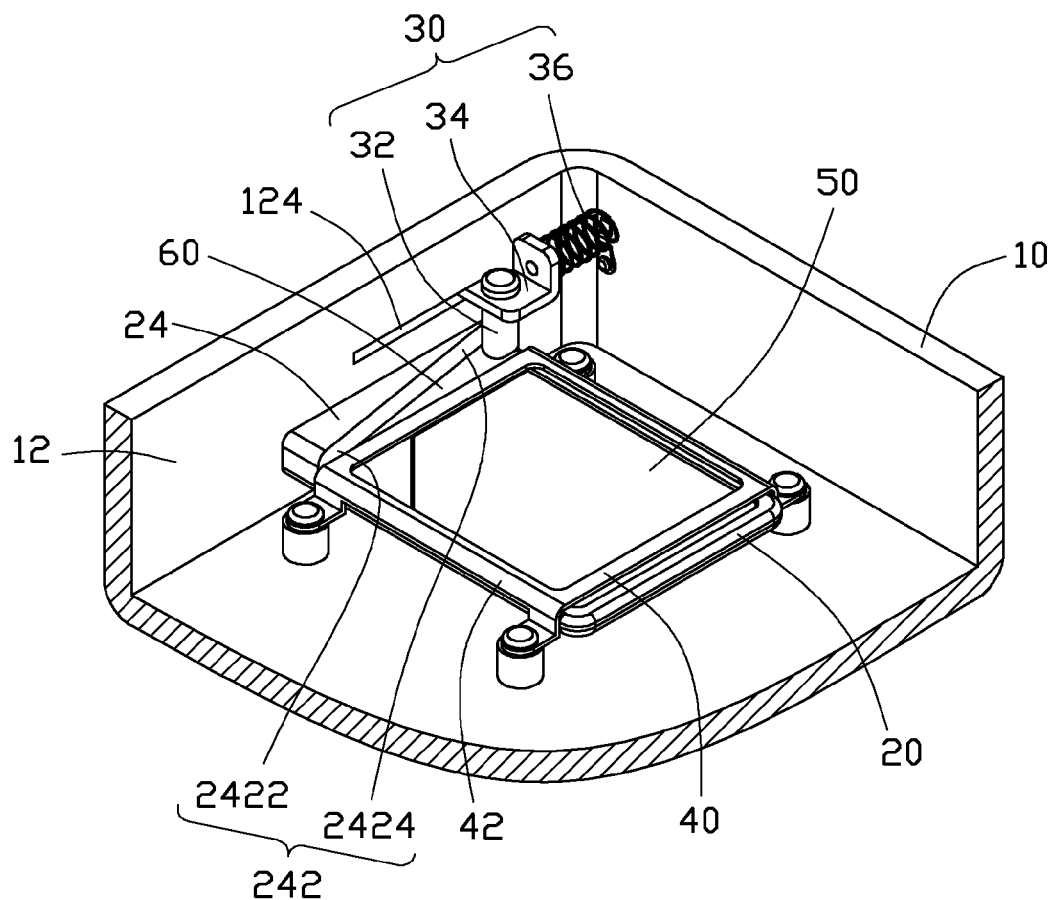
FIG. 2 is a partial, isometric view of the electronic device of FIG. 1.

FIG. 1 and FIG. 2 illustrate an embodiment of an electronic device 100 providing card holder access. The electronic device 100 includes a housing 10, a card holder 20, a card holder control mechanism 30, and a card holder retaining element 40. The card holder 20 is to receive an electronic card 50, such as a smart card or a memory card. When the card holder 20, loaded with the electronic card 50, is retained within the housing 10, the electronic card 50 is connected to a connector (not shown) of the electronic device 100, thus the electronic card 50 is secured in the housing 10 and is electronically connected to a circuit board (not shown) of the electronic device 100 via the connector.

A sidewall 12 of the housing 10 defines a first slot 122 and a second slot 124 extending along a longitudinal side of the housing 12. The first slot 122 is substantially parallel with the second slot 124. The card holder 20 can be driven to partially extend out of the first slot 122. A top surface of the card holder 20 defines a receiving recess 22 (see FIG. 5) to receive the electronic card 50. The card holder 50 s insertable into the housing 10 through the first slot 122 along a first direction. A resisting block 24 protrudes from the top surface of the card holder 50 and includes an inclined surface 242 facing the receiving recess 22. The inclined surface 242 includes a first end 2422 adjacent to the receiving recess 22 and a second end 2424 away from the receiving recess 22. The mechanism 30 includes a pushing post 32 perpendicular to the top surface of the card holder 50, a slidable button 34 arranged outside the housing 10, and an elastic element 36. An upper end of the pushing post 32 is secured to the slidable button 34, and a lower end of the pushing post 32 rests on the card holder 20 and abuts the inclined surface 242. The slidable button 34 includes an operation portion 342 extending from the upper end of the pushing post 32 to an outside of the housing 10 through the second slot 124. The operation portion 342 is slidable along the second slot 124 perpendicular to the first direction, thereby causing the lower end of the pushing post 32 to slide on the inclined surface 242 from the second end 2424 to the first end 2422. One end of the elastic element 36 is connected to the slidable button 34, and an opposite end of the slidable button 34 is connected to the housing 10. The element 40 is secured to an inner of the housing 10 and arranged to cover the receiving recess 22. A gap 60 is formed between the element 40 and the inclined surface 242. The lower end of the pushing post 32 is disposed within the gap 60. The element 40 includes two opposite sidewalls 42. The distance between the sidewalls 42 is substantially equal to the width of the card holder 20. Thus, the card holder 20 can be partially extended out of the first slot 122 by the pushing post 32.

Figure 3:
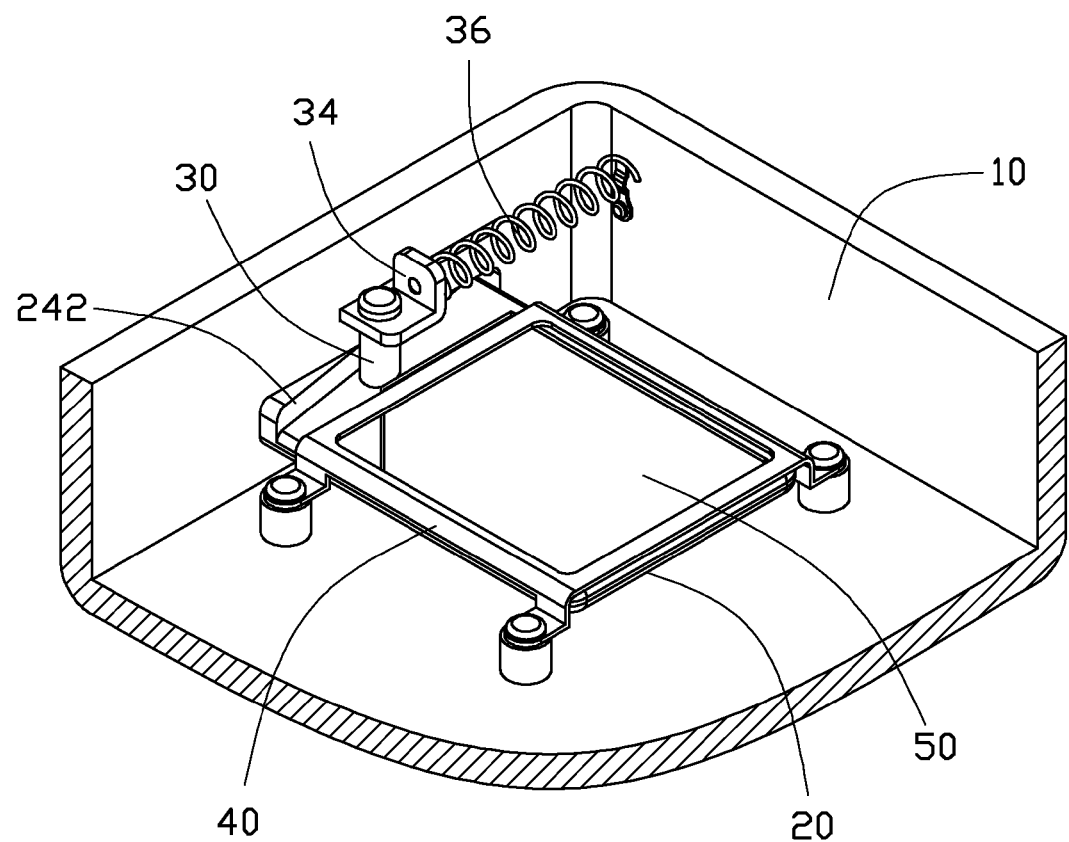
FIG. 3 is another partial, isometric view of the electronic device of FIG. 1, showing a portion of the card holder extending out of the electronic device of FIG. 1.
Figure 4:
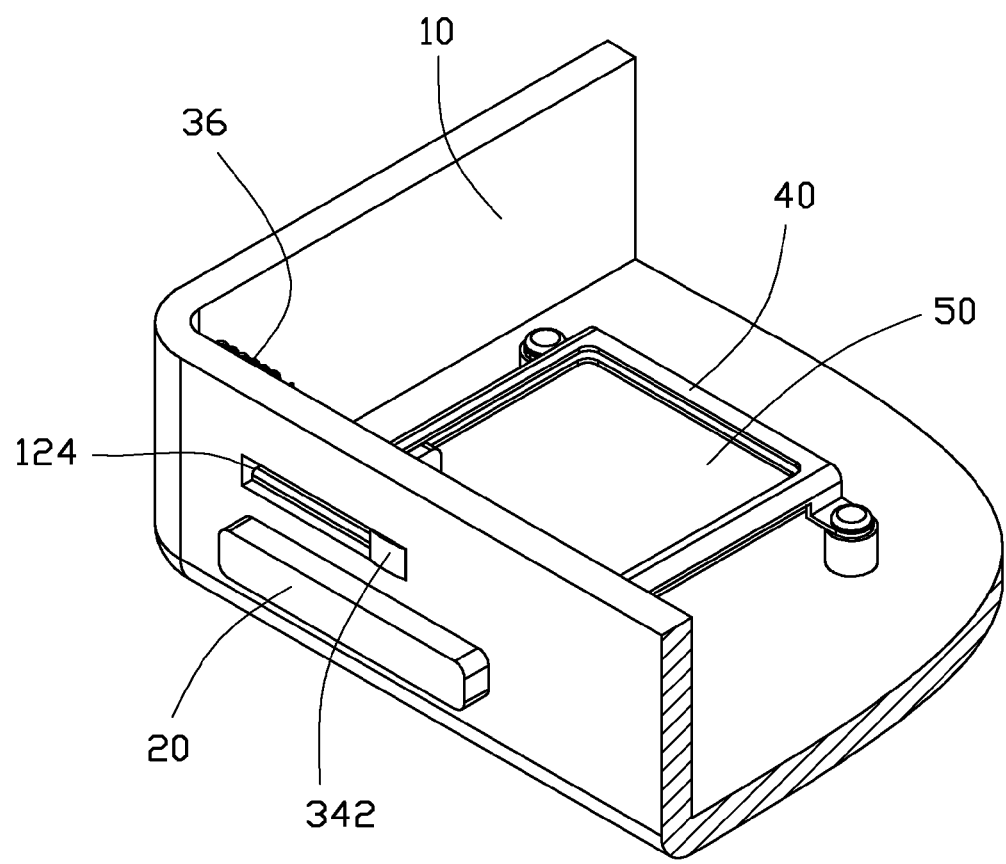
FIG. 4 is similar to FIG. 3, but viewed from another viewpoint.

Referring also to FIG. 3 and FIG. 4, to take out the card holder 20, the operation portion 342 of the slidable button 34 is slid along the second slot 124. With the movement of the slidable button 34, the elastic element 36 is stretched, and the pushing post 32 is jointly moved with the slidable button 34 along a direction parallel to the second slot 124. The engagement of the pushing post 34 and the inclined surface 242 pushes the card holder 20 to partially extend out of the first slot 122. At this point, the operation portion 342 is released, and the elastic element 36 rebounds to drive the slidable button 34 and the pushing post 32 to return to their original state. At this point, the card holder 20 can be easily grasped and pulled out of the housing 10.

Figure 5:
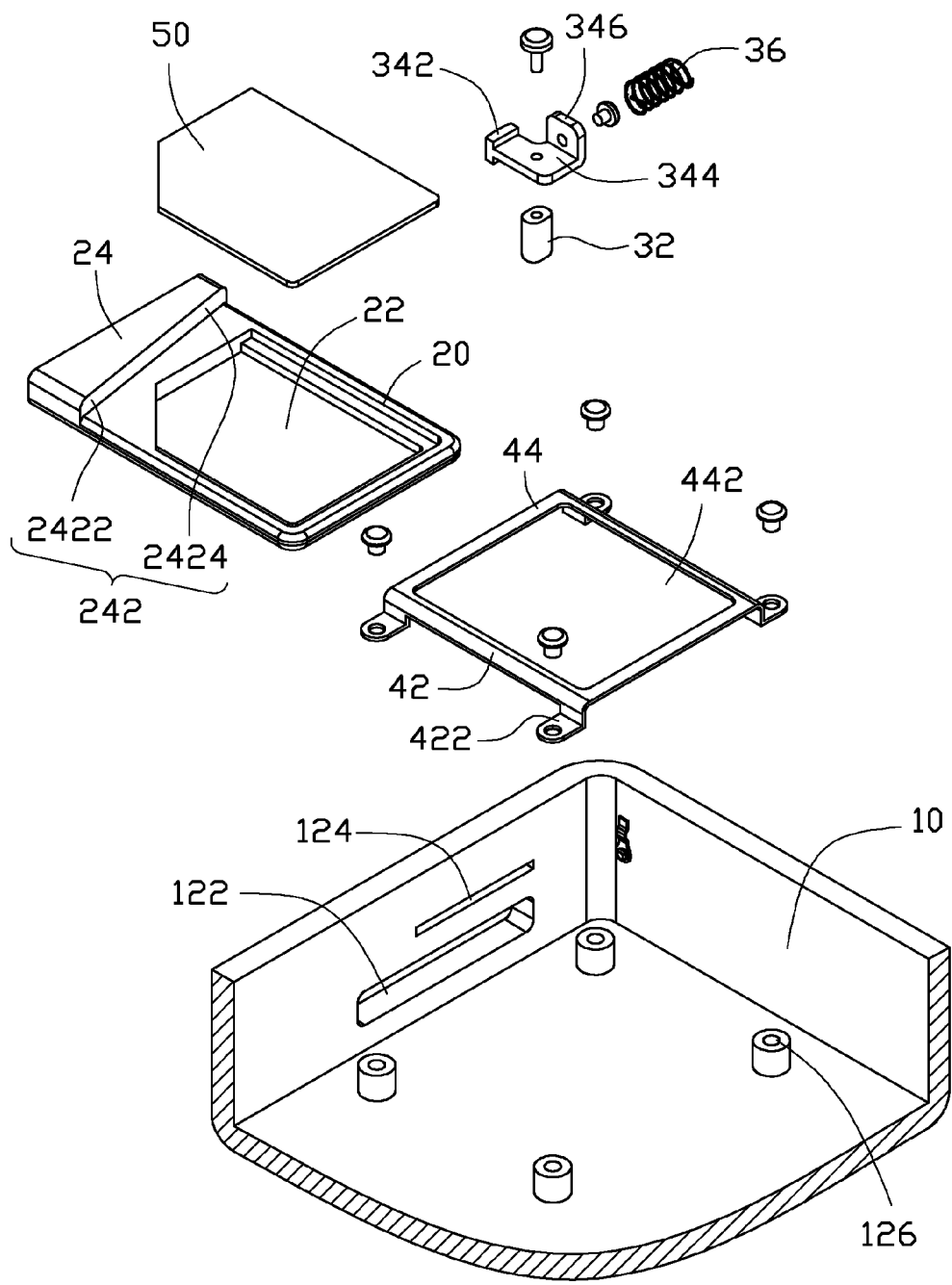
FIG. 5 is an exploded, perspective view of the electronic device of FIG. 2.

Referring to FIG. 5, the slidable button 34 further includes a first connecting portion 344 perpendicularly secured to the operation portion 342 and a second connecting portion 346 perpendicularly secured to the first connecting portion 344. The upper end of the pushing post 32 is secured to the first connecting portion 344. One end of the elastic element 36 is connected to the second connecting portion 346.

In this embodiment, four fixing posts 126 protrude from the inner of the housing 10. The four fixing posts 126 cooperatively form a rectangular. The first slot 122 is arranged between two fixing posts 126 adjacent to the sidewall 12 of the housing 10. The element 40 further includes a top surface 44 connecting the opposite sidewalls 42 to each other. The top surface 44 defines a receiving cavity 442 extending through the element 40. A pair of positioning tabs 422 protrudes from a bottom of the sidewall 42 and extends along a direction substantially perpendicular to the sidewall 42. The cooperation of the four positioning tabs 422 and four fixing posts 126 secures the element 40 to the inner of the housing 10.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
   a housing including a sidewall, a first slot, and a second slot defined in the sidewall, the second slot being parallel with the first slot;
   a card holder including a top surface defining a receiving recess configured to receive an electronic card, the card holder being insertable into the housing through the first slot along a first direction;

a resisting block protruding from the top surface of the card holder, the resisting block comprising an inclined surface substantially perpendicular to the top surface and facing the receiving recess, the inclined surface comprising a first end adjacent to the receiving recess and a second end away from the receiving recess; and a card holder control mechanism comprising a pushing post perpendicular to the top surface, a slidable button arranged outside the housing, and an elastic element, an upper end of the pushing post being fixed to the slidable button, a lower end of the pushing post resting on the top surface and abutting the inclined surface, the slidable button comprising an operation portion extending from the upper end of the pushing post to an outside of the housing through the second slot, the operation portion being slidable along the second slot along a second direction perpendicular to the first direction, thereby causing the lower end of the pushing post to slide on the inclined surface from the second end to the first end, thus urging the card holder to move outwardly, the elastic element being configured to apply a force to the slidable button in a direction away from the first end of the inclined surface.

2. The electronic device as described in claim 1, wherein the slidable button further comprises a first connecting portion perpendicularly secured to the operation portion and a second connecting portion perpendicularly secured to the first connecting portion, the upper end of the pushing post is secured to the first connecting portion, and the elastic element is connected to the second connecting portion.

3. The electronic device as described in claim 1, wherein a plurality of positioning posts protrudes from an inner of the housing, the electronic device further comprises a card holder retaining element secured to the positioning posts, the receiving recess of the card holder is arranged below the card holder retaining element, a gap is formed between the card holder retaining element and the resisting block, the lower end of the pushing post is disposed within the gap, the card holder retaining element comprises two opposite sidewalls, the distance between the two opposite sidewalls of the card holder retaining element is substantially equal to the width of the card holder.

4. The electronic device as described in claim 3, wherein the first slot is arranged between two of the positioning posts adjacent to the sidewall of the housing.

5. The electronic device as described in claim 3, wherein the card holder retaining element further comprises a plurality of positioning tabs extending along directions perpendicular to the opposite sidewalls of the card holder retaining element, each of the plurality of the positioning tabs is secured to the corresponding positioning post.

* * * * *